US006058589A

United States Patent [19]

Hakansson

[11] Patent Number: 6,058,589

[45] Date of Patent: May 9, 2000

[54] APPARATUS AND METHOD OF MAKING PALLET COLLAR COMPONENTS

[75] Inventor: Leif Erik Vilhelm Hakansson, Månsarp, Sweden

[73] Assignee: Svenska Balk System Aktiebolag, Sweden

[21] Appl. No.: 09/073,075

[22] Filed: May 4, 1998

[51] Int. Cl.[7] .............................. B23P 11/00

[52] U.S. Cl. .............................. 29/432; 29/772; 144/1.1; 144/329; 144/356; 144/382; 227/7; 227/100

[58] Field of Search .............................. 144/1.1, 3.1, 2.1, 144/329, 356, 357, 382; 29/432, 772, 434, 527.1, 56, 524.1; 227/7, 100, 101, 151, 152; 220/62

[56] References Cited

U.S. PATENT DOCUMENTS

| | | |
|---|---|---|
| 1,123,250 | 1/1915 | Crebbin . |
| 3,198,370 | 8/1965 | Briand . |
| 3,557,439 | 1/1971 | Dykeman . |
| 3,706,408 | 12/1972 | Burch . |
| 3,814,153 | 6/1974 | Schmidt . |
| 3,968,560 | 7/1976 | Vial . |
| 3,982,313 | 9/1976 | Nelson, Jr. . |
| 4,314,649 | 2/1982 | Blomqvist . |
| 4,394,952 | 7/1983 | Crane . |
| 4,403,388 | 9/1983 | Belcher . |
| 4,435,028 | 3/1984 | Rivkin . |
| 4,834,254 | 5/1989 | Mead . |
| 4,967,948 | 11/1990 | Allspaw . |
| 5,058,795 | 10/1991 | Tonus . |
| 5,386,919 | 2/1995 | Long . |

*Primary Examiner*—W. Donald Bray
*Attorney, Agent, or Firm*—Fasth Law Offices; Rolf Fasth

[57] ABSTRACT

The automatic pallet collar apparatus comprises a frame that has a fixed rail and a movable rail to adjust the width of the frame. A rotatable driving member is in operative engagement with the frame to move forward a set of wood members. A downstream cutting station cut the wood members into a precise length. The drilling station drills holes into the wood member and rivets are dropped into the holes at the rivet mounting station. A downstream turner station turns each wood member downside up and a hinge is positioned onto the rivets at the hinge mounting station. The rivets are then fastened to firm hold the hinge to the wood member. A suitable logo may be printed in the screen printing station and the finished pallet collar components are then stacked at the stacker station.

20 Claims, 2 Drawing Sheets

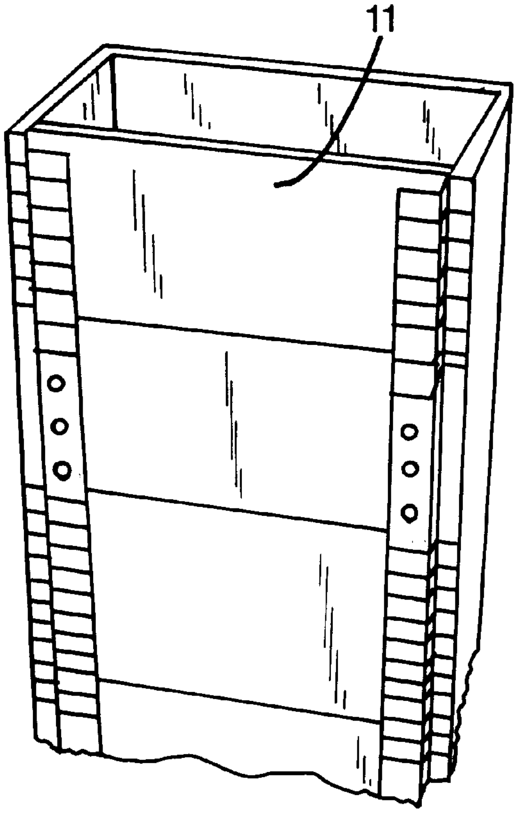
FIG. 2
FIG. 3
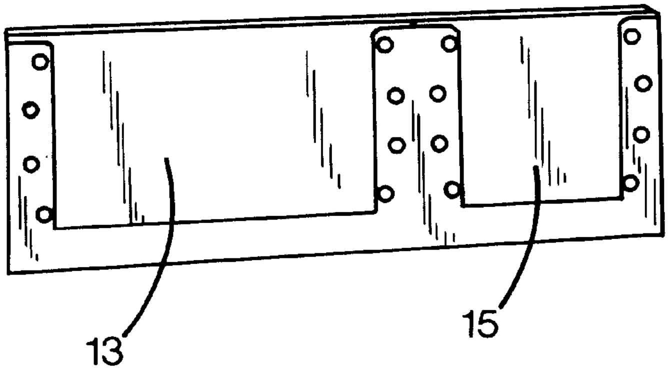

APPARATUS AND METHOD OF MAKING PALLET COLLAR COMPONENTS

TECHNICAL FIELD

The invention relates to an apparatus and method for automatically manufacturing pallet collar components.

BACKGROUND INFORMATION AND SUMMARY OF THE INVENTION

The use of pallet collars is an effective and inexpensive way of building a container to a desired height on a wooden pallet. The pallet collars may be used to transport a wide variety of goods that require some protection during the transportation. In the past, pallet collars have been manufactured manually which is a labor intensive and expensive process. Also, manual production of pallet collars often result in pallet collars that have a non-uniform quality. Manual production has proven to be particularly expensive and ineffective for large volume production. There is a need for an inexpensive and reliable automatic manufacturing process for making pallet collars with a uniformly high quality.

The present invention an effective automatic pallet collar apparatus that comprises a frame that has a fixed rail and a movable rail to adjust the width of the frame. A rotatable driving member is in operative engagement with the frame to move forward a set of wood members. A downstream sawing station saws the wood members into a precise length. The drilling station drills holes into the wood member and rivets are positioned into the holes at the rivet mounting station. A downstream turner station turns each wood member downside up and hinges are mounted onto the rivets at the hinge mounting station. The rivets are then fastened to firmly hold the hinges to the wood member at a rivet fastening station. A suitable logo may be printed on the wood members in the screen printing station and the finished pallet collar components are then stacked at the stacker station.

BRIEF DESCRIPTION OF THE DRAWINGS

FIG. 2 is a perspective view of a pallet collar assembly of the present invention; and FIG. 3 is a perspective view of a pallet collar components of the present invention.

DETAILED DESCRIPTION

Figure 1:
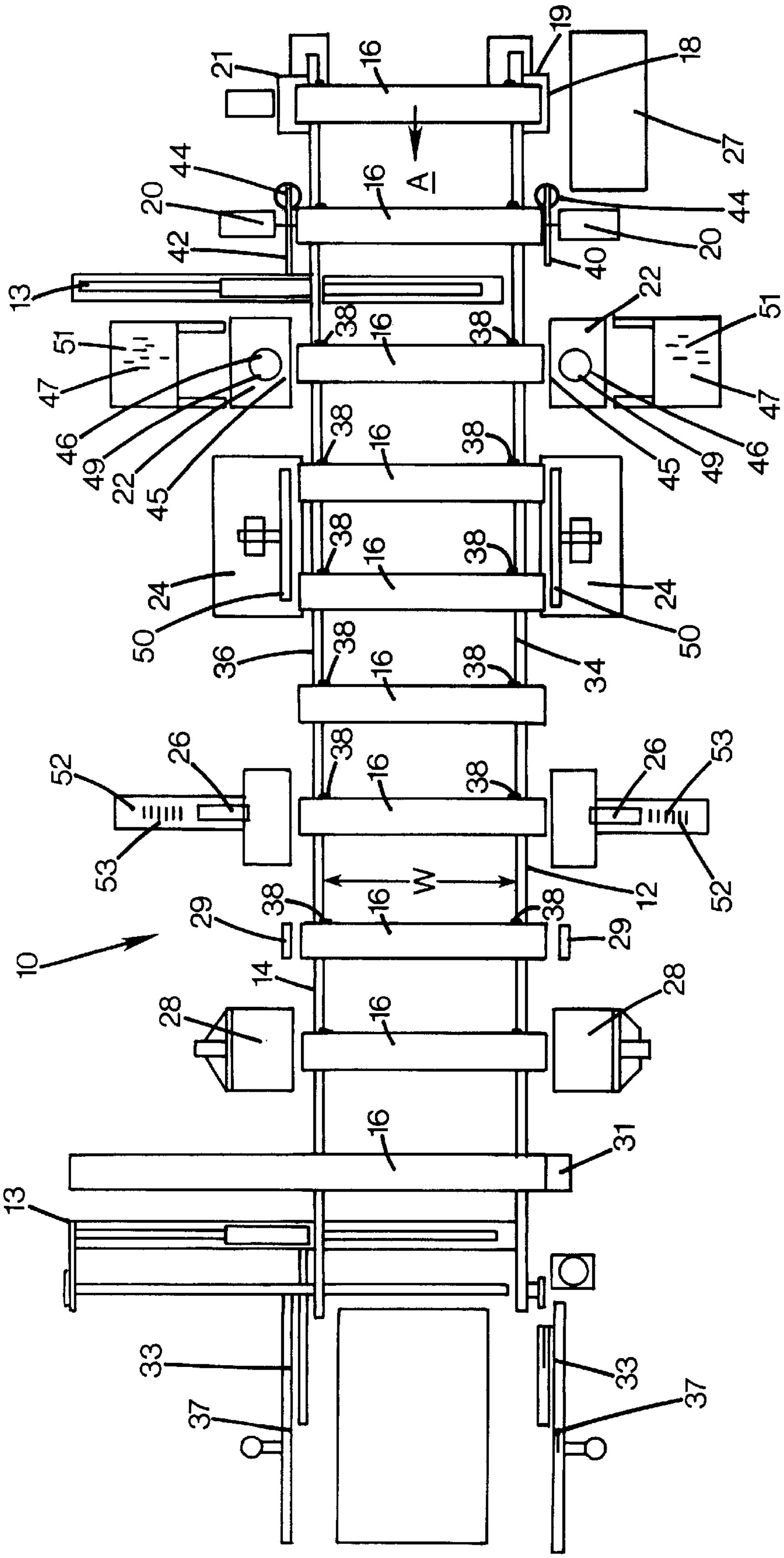
FIG. 1 is a perspective view of the pallet collar apparatus of the present invention.

With reference to FIGS. 1–3, the present invention is a pallet collar apparatus 10 for automatic manufacturing of unassembled pallet collar components. A pallet collar assembly 11 is shown in FIG. 2 and a pallet collar component 13 pivotally attached to a pallet collar component 15 are shown in FIG. 3. The apparatus 10 makes one of the pallet collar components 13, 15 per production batch. The components 13, 15 may be attached to other pallet collar components to form rectangular shaped pallet collar segments that may be stacked on top of another to form the pallet collar assembly 11.

The apparatus 10 has a first fixed lance rail 12 and a parallel adjustable rail 14 so that an operative width W of the apparatus 10 may be adjusted by moving the adjustable rail 14 relative to the fixed rail 12 on a cross member 13 and attach the rail 14 to the cross member 13. The width W may be adjusted between about 543 millimeters and about 2,400 millimeters to adjust and set the width according to the length of the wood members 16.

Preferably, the wood members 16 are precut to a length that is slightly longer, such as about 5–10 millimeters longer, than the desired length of the finished pallet collar component. For example, if the desired final length of the pallet collar component is about 2,000 millimeters long, the wood members may be precut to have a length that is about 2,010 millimeters. The wood members 16 preferably are about 195–200 millimeters wide and the thickness is about 20 millimeters. For most pallet collar applications, the width and the thickness of the wood members are according to the above-mentioned standard dimensions except for the length that may vary greatly. However, it is to be understood that the wood members may have any suitable dimensions.

In the preferred embodiment, the apparatus 10 has a plurality of work stations that are lined up along and in operative engagement with the rails 12, 14. A plurality of elongate wood members 16 are stacked on top of one another in a storage unit 18 that is not necessarily attached to the rails 12, 14 but may be separate therefrom. The wood members are stacked in a direction that is perpendicular to the length of the apparatus.

In the preferred embodiment, the apparatus 10 comprises a sawing station 20, a drill and riveting mounting station 22, a turner station 24, a hinge mounting station 26, a riveting station 28, a screen printing station 31, an out-feeder station 33 and a stacker station 37 for stacking the finished pallet collar components. The work stations are disposed about 450 millimeters from one another but the distance between each station may be fine adjusted to ensure that each work station is operating as effectively as possible.

The storage unit 18 may have vertical flanged end walls 19, 21 with an open insides and top so that the storage unit may be filled with the wood members 16 from the top. The end wall 19 is in operative engagement with the rail 12 and the end wall 21 is in operative engagement with the 14 so that any adjustment of the width W of the apparatus 10 also adjusts the width of the storage unit 18. In the preferred embodiment, the storage unit 18 may hold about 25 wood members stacked on top of one another. The storage unit 18 has a directional adjustment mechanism that urges the wood members 16 into a suitable position so that the wood member are properly positioned before the wood members are fed into the apparatus. The storage unit 18 has a level controller so that if the level of wood members is under a certain predetermined level a stop signal is transmitted a control unit 27 to stop the entire apparatus 10. For example, the storage unit 18 may be set to send the stop signal when the storage unit 18 has no wood members in the storage unit 18. However, the apparatus 10 does not start automatically when the storage unit 18 is filled with wood members 16. Preferably, it is necessary to manually start the apparatus 10 for safety reasons.

Each rail 12, 14 has rotatable feeding chains 34, 36, respectively, in operative engagement with the rails. The feeding chains 34, 36 extend along almost the entire length of the apparatus 10 so that an upper part of the chains moves the wood members forwardly in the direction of the arrow A in a step-like fashion because the chains temporarily stop rotating when the wood members are properly positioned at each work station and the chains resume the driving of the wood members when the tasks at every station is completed. It is to be understood that the invention is not limited to the use of chains as a driving means because any suitable feeding device may be used such as rotatable belts. As described in detail below, the work stations, preferably, operate simultaneously and the chains 34, 36 do not resume the forward movement of the wood members 16 to the next station until a completion signal is received by the control panel 27 from all the work stations.

The chains 34, 36 include upwardly protruding flanges 38 that are about 15 millimeters high and attached to the chains at intervals of about 450 millimeters which is the same as the distance between the work stations. When the feed members 38 of the chains 34, 36 move up behind the bottom wood member 16 in the stack of wood members stored in the storage unit 18, the feeding members 38 engage the bottom wood member 16 and move the wood member in a forward direction towards the saw station 20.

The chains 34, 36 may move up to a speed of about 12 meters per minute. In the preferred embodiment, the apparatus is set to produce a pallet collar component about every seven seconds and because the work stations are disposed about 450 millimeters from one another, the work stations are synchronized with the movement of the feed members 38 that are also disposed about 450 millimeters from one another on the two parallel chains. In this way, each work station may perform its particular task simultaneously with the tasks performed by the other work stations.

When the first wood member 16 is moved by the feeding members 38 from the storage unit 18 and arrives at the sawing station 20, the rotation of the chains 34, 36 is stopped because a sensor disposed at the saw station 20 senses that the wood member 16 has arrived to the saw station 20. More particularly, the sensor may include photo cells that trigger the transmission of a stop signal to the control unit 27 to stop the movement of the chains 34, 36 so that the sawing operation of the wood member 16 can start. Preferably, the first wood member 16 is held in place by a stopper and a downwardly pressing holder that is pneumatically driven. Each work station downstream of the sawing station 20 has a pneumatically driven holding mechanism that is identical or very similar to the holding mechanism used at the sawing station 20. Prior to being fixedly held in place, the wood member 16 is also pushed against the fixed rail 12 and the length of the wood member 16 is controlled at the sawing station 20. The wood member is held stationary in place so that the wood member 16 is correctly positioned both sideways and lengthwise.

When the first wood member 16 is properly held in place, a rotating saw 40 in operative engagement with the first rail 12 is moved upwardly and cuts an end portion of the wood member 16 and moves back down. The width of the rotating saw 40 is about 4 millimeters and about 2 millimeters of the very outer end of the wood member 16 is cut to make sure that the end surface of the wood member 16 is perpendicular to the length of the wood member. The opposite end adjacent the rail 14 of the wood member 16 is also simultaneously cut by an upwardly moving rotating saw 42. The saw 42 not only makes sure that the end surface of the wood member 16 is perpendicular but also fine adjusts the length of the wood member. Adjacent the saw 42 is a reducer 44 disposed that grinds up any portion that is cut off from the wood member 16. For example, if the wood member 16 is 10 millimeters too long and the rotating saw 40 cuts off 2 millimeter at the end that is adjacent the rail 12 and the reducer 44 grinds up a piece that is about 4 millimeters long if the width of the blade of the saw 42 is about 4 millimeters. Below the sawing station 20 there is a saw dust collector with a suction device that collects the saw dust from the saws 40, 42 and the reducer 44. When the cutting of the wood member is complete, the saws 40, 42 move back down and a completion signal is sent to the control unit 27 that the sawing operation is completed and the wood member at the saw station 20 is ready to be forwarded to the drilling and riveting and mounting station 22. However, the chains 34, 36 are not activated to forward the wood members 16 until all the work stations of the apparatus 10 has sent completion signals to the control unit 27.

When all the work stations are finished with its respective task, the wood member 16 may be moved by the feeding members 38 to the drilling and rivet mounting station 22 until a sensor at the station 22 senses that the wood member 16 has arrived and is ready for drilling. The sensor then sends a stop signal to the control unit 27 to stop the rotation of the chains 34, 36. The control unit 27 does not wait until the unit 27 has received stop signals from all the work stations. Instead, it is sufficient for the control unit 27 to receive a stop signal from one of the work stations to stop the rotation of the chains 34, 36.

The wood member 16 at the station 22 is then locked into place and pushed against the fixed rail 12 and the length is determined by the portion of the station 22 that is adjacent to the rail 14. Because the end portions of the wood members are perfectly perpendicular dug to the precise sawing operation at the sawing station 20, the position of the wood members 16 may be precisely adjusted prior to the drilling operation. Drill units 45 may then move upwardly from below the wood member and drill four poles at each end of the wood member 16 and return back to a retracted position. The position of the holes are now precisely positioned relative to the end portions of the wood member. The rivet mounting unit 46 of the station 22 has a container 47 that is filled with rivets 51. Preferably, the mounting unit 46 rocks so that the rivets 51 are forced into an feeding position and lined up in the container 47 prior to being dropped into the holes drilled into the wood member 16.

Hammer units 49 of the station 22 disposed at each end of the wood member may press on the rivets 51 from above to make sure that the rivets 51 are properly positioned within the holes and slightly pressed into the wood member 16. The holder of the wood member is then released and the wood member is ready to be transported by the feeding members 38 to the next work station. When each station is finished, completion signals are sent to the control unit 27. When the control unit 27 has received signals from all the work stations, the chains 34, 36 are activated to move the wood members 16 forwardly.

The wood member 16 at the station 22 is then transported to the turner station 24. It is to be noted that all the wood members 16 that are engaged by the feeding members 38 are moved forwardly simultaneously when the chains 34, 36 are activated so that a plurality of wood members disposed about 450 millimeters from one another are simultaneously forwarded by the feeding members 38 of the chains 34, 36.

The turner station 24 has a fork unit 50 that catches the wood member 16 as it is being forwarded and turn the wood member 180 degrees so that the wood member is downside up. The turner station 24 is not activated until the sensor at the turner station 24 senses that the wood member 16 is in position to be turned. The wood member 16 is turned downside up so that the end portions of the rivets protrudes upwardly through the wood member 16. Again, when the control unit 27 has received the completion signal from the turner station together with completion signals from all the other stations, the rotation of the chains 34, 36 resumes and the wood members are forwarded to the next work stations assuming that there is a sufficient amount of wood members stored in the storage unit 18. As mentioned earlier, the storage unit 18 sends a stop signal when there is an insufficient amount of wood members stored in the storage unit 18.

When the wood member arrives to the hinge mounting station 26. The sensor at the station 26 senses that the wood member has arrived and a stop signal is sent to the control unit 27 to stop the rotation of the chains 34, 36. The wood member is then properly positioned and locked in place at the station 26. The station 26 has a hinge magazine 52 that contains a plurality of hinges 53 that are lined up in a queue. The hinges may be pushed towards the wood member in a direction that is perpendicular to the movement of the wood member and placed on the protruding rivets on the precisely cut and drilled wood member. The wood member is then ready to be forwarded to the riveting station 28.

However, between the mounting station 26 and the riveting station 28 there is, preferably, a control counter 29 that counts the number of rivets in the wood member 16 to make sure that the wood member has eight rivets protruding through the holes of the wood member. If at least one rivet is missing, an alarm signal is transmitted by the control counter 29 to the control unit 27 to stop the rotation of the chains so that the operator may insert the missing rivets before the operator manually starts the movement of the chains again to continue the forward transportation of the wood members. The alarm signal may also indicate on which side of the wood member there is a rivet missing. The wood member is then ready to be transported to the riveting station 28. When the control unit 27 receives the completion signals from all the work stations including the mounting station 26, the chains 34, 36 are again permitted to move the wood members forward another 450 millimeters so that the wood members are positioned at the next work stations.

Similar to the upstream work stations, when the wood member 16 arrives to the riveting station 28, the sensor at the riveting station senses that the wood member 16 has arrived and sends a stop signal to the control unit 27. The wood member 16 is then locked into place by a holding mechanism that is similar to the holding mechanism described above. Before the rivets are fastened, the riveting station 28 controls that the hinges are properly mounted on the wood member 16. The riveting station 28 at the rail 14 controls the length of the wood member by pushing against the hinge mounted on the wood member. The rivets are then fastened to the hinges and the wood member to firmly hold the hinges to the wood member 16. When the rivets are properly fastened, the riveting station sends a completion signal to the control unit 27. When the control unit 27 has received the completion signals from all the units, the chains 34, 36 are re-activated to move the wood members forwardly to the next station. The wood member at the riveting station 28 is forwarded into the screen printing station 31 that may print a suitable company name or any other text or picture on the wood member 16 after the chains 34, 36 have stopped as described above. When the control unit 27 has received the completion signals from all the work stations including the printing station 31, the chains are activated and the wood member 16 is forwarded to the feeder station 33.

The feeder station 33 feeds the wood members from the printing station 31 to the stacker station 37. The stacker station 37 has a receiver that may receive a first layer of wood member that are placed side by side. When the receiver is filled, the layer is lowered about 25–30 millimeters into the stacker station 37 and the receiver is ready to receive another set of wood members from the feeder station 33. If the stacker station 37 is full an alarm signal is transmitted to the control unit and the apparatus 10 stops until the stacker station 37 has been emptied. The operator may then manually start the apparatus 10 again.

While the present invention has been described in accordance with preferred compositions and embodiments, it is to be understood that certain substitutions and alterations may be made thereto without departing from the spirit and scope of the following claims.

I claim:

1. A pallet collar apparatus for producing pallet collar components from a wood member, comprising:

a frame having a fixed rail and a movable rail, the movable rail being movable relative to the fixed rail to adjust a width of the frame;

a rotatable driving member in operative engagement with the frame;

a sawing station in operative engagement with the frame;

a rivet mounting station downstream of the sawing station in operative engagement with the frame;

a turner station downstream of the rivet mounting station in operative engagement with the frame; and a hinge mounting station downstream of the turner in operative engagement with the frame.

2. The pallet collar apparatus according to claim 1 wherein the apparatus further comprises a storage unit that is disposed upstream of the sawing station, the storage unit having an adjustable width and the rivet mounting station having a drilling unit.

3. The pallet collar apparatus according to claim 1 wherein the apparatus further comprises a control unit that is electrically connected to the driving member to turn on and off a rotational movement of the driving member and a riveting station is disposed downstream of the hinge mounting station to fasten rivets to the wood member.

4. The pallet collar apparatus according to claim 1 wherein the driving member comprises rotatable chains rotatably attached to the fixed rail and the movable rail, the rotatable chains having a plurality of pegs attached thereto for engaging the wood member to move the wood member in a forward direction in the apparatus.

5. The pallet collar apparatus according to claim 1 wherein sawing stations has a first saw device disposed below a first holding unit at the fixed rail and a second saw device disposed below a second holding unit at the movable rail, the first and second saw devices being upwardly movable into an operable position and downwardly movable into a retracted position.

6. The pallet collar apparatus according to claim 1 wherein the rivet mounting station has a container containing a plurality of rivets, the container being rockable to urge the rivets into a desirable position inside the container.

7. The pallet collar apparatus according to claim 1 wherein the hinge mounting station comprises a feeder mechanism for holding and feeding a plurality of hinges.

8. A method of manufacturing a pallet collar component, the method comprising the steps of:

providing a wood member having an upside;

providing a plurality of rivets and hinges;

placing the wood member on a rotatable carrier;

transferring the wood member on the rotatable carrier to a cutting section;

cutting the wood member to a predetermined length;

transferring the wood member on the rotatable carrier to a drilling section;

drilling openings into the wood member;

placing the rivets into the openings so that a portion of the rivets protrude beyond the wood member;

turning the wood member 180 degrees;

mounting the hinges on the portion of the rivets protruding beyond the wood member;

fastening the rivets to the hinges and the wood member; and removing the wood member from the rotatable carrier.

9. The method according to claim 8 wherein the step of transferring the wood member to the cutting station further comprises the steps of detecting the wood member at the cutting section and sending a stop signal to a control unit and the step of cutting the wood member further comprises the step of sending a completion signal to the control unit when the cutting of the wood member is completed.

10. The method according to claim 8 wherein the step of drilling further comprises the step of controlling a length of the wood member and adjusting a position of the wood member prior to drilling the openings into the wood member.

11. The method according to claim 8 wherein the step of placing the rivets further comprises the step of hammering on the rivets.

12. The method according to claim 8 wherein the method further comprises the step of detecting the wood member at the cutting station and stopping the rotatable carrier prior to cutting the wood member.

13. The method according to claim 12 wherein the step of stopping the rotatable carrier further comprises the step of holding the wood member in a fixed position.

14. The method according to claim 13 wherein the step of holding further comprises the step of urging the wood member against a fixed rail prior to holding the wood member.

15. The method according to claim 14 wherein the step of urging the wood member further comprises the step of controlling a length of the wood member.

16. The method according to claim 8 wherein the step of cutting further comprises the step of cutting the wood member at each opposite end of the wood member.

17. The method according to claim 16 wherein the step of cutting the wood member at each opposite end further comprises the step of grinding up a piece cut off from the wood member.

18. The method according to claim 8 wherein the method further comprises the step of rocking a container containing the rivets prior to placing the rivets on the wood member.

19. The method according to claim 8 wherein the method further comprises the step of printing a logo on the wood member.

20. The method according to claim 19 wherein the method further comprises the step of receiving wood members and stacking a plurality of wood member.

* * * * *